Dec. 7, 1937. B. C. ROBERTSON, 2,101,346
BALL BEARING MOUNTING
Filed Oct. 15, 1935

Inventor
Benjamin C. Robertson
By
Attorney

Patented Dec. 7, 1937

2,101,346

UNITED STATES PATENT OFFICE 2,101,346

BALL BEARING MOUNTING

Benjamin C. Robertson, Los Angeles, Calif.

Application October 15, 1935, Serial No. 45,089

3 Claims. (Cl. 308—184)

My invention relates to improvements in the method of setting or mounting radial ball or roller bearings and the retaining of such anti-friction bearings in their proper relative position or location. Anti-friction bearings of the class referred to consist of an inner and outer race having the anti-friction members, such as balls or rollers, interposed between the races. This unit is commonly mounted by providing a bore of the exact size to receive and tightly fit the outer race of the bearing. The mounting or member in which the bearing is mounted may be either a rigid or stationary member or it may be a rotatable member such as a pulley or wheel.

It is extremely important in obtaining the highest efficiency of the bearing that the bearing should not only fit snugly in the bore of the mounting but that the two races of the bearing should not be exposed to such strains as would destroy the parallel relationship of the inner and outer races of the bearing. For a number of reasons it is extremely difficult to have the bearing mounted so that the strains referred to are eliminated. The factors resulting in the undesired conditions referred to may in part be enumerated as follows:

Bearing in mind that it is desirable to provide a uniform tension about the periphery of the outer race this cannot be done where the bearings are mounted in materials of a relatively high coefficient of expansion and the bearing is exposed to extreme temperature changes during operations; or where it is imperative that mountings be salvaged which have been bored over size or which through warpage or abuse no longer provide sufficient surface tension to retain the bearing.

This method is not offered as a solution for definitely known or predetermined conditions of severe misalignment; but inasmuch as tolerances or limits in manufacturing processes, assume the presence of measurable error, and since assembly operations must provide for the existence of accumulative error, the mounting of a precision unit, such as a high grade ball bearing, deserves a method of mounting that will permit it to function in a setting that approaches more nearly the ideal than the commonly used, rigid type of mount permits.

The principal object of this invention is to provide a bearing mounting for anti-friction bearings of the ball or roller type by means of which a uniform tension is provided about the periphery of the outer race, so constructed that impact or shock load is cushioned and which will permit a self alignment of the bearing in the mounting so that the bearing may accommodate itself to mis-alignment of either the bearing points of the mounting or the shaft or other members upon which the inner race is located.

Referring to the drawing which is for illustrative purposes only—

Figure 1:
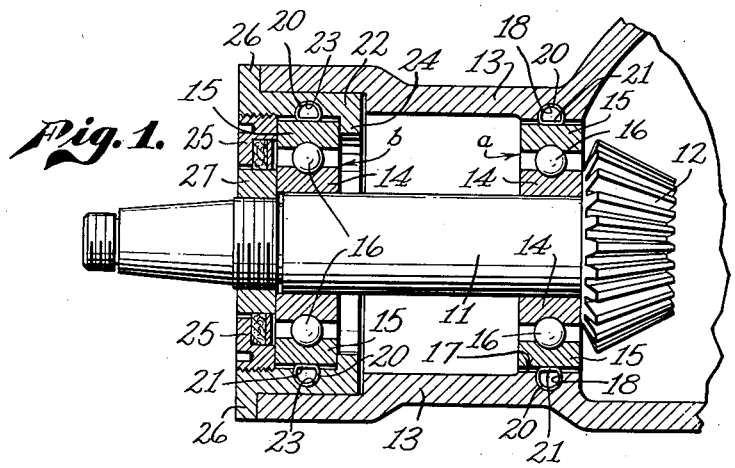
Fig. 1 shows a sectional view of a pinion drive shaft assembly with bearing mountings shown thereon embodying a form of my invention.

Referring more particularly to the devices illustrated in Fig. 1, 11 designates a pinion drive shaft and 12 the pinion thereon, 13 designating the housing for the shaft and pinion. Pinion shafts are usually mounted in two anti-friction bearings. In the form shown one bearing being designated at "a" and the other being designated at "b."

The bearing "a" consists of an inner race 14 and an outer race 15 having either balls, indicated at 16, or rollers (not shown) interposed between the inner and outer races as is the usual form of construction.

Figures 2, 2A:
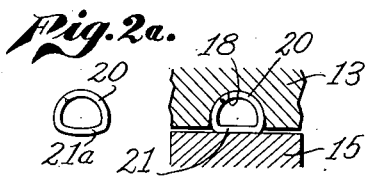
Fig. 2 is a diagrammatic view of a bearing mounting showing one form of my invention.
Fig. 2a is a cross sectional view of the coil spring shown in Fig. 2 prior to compression of the spring in its groove.

Ordinarily the bearing "a" is pressed into a bore in the housing 13, such bore being illustrated at 17, but in the present instance the bore is provided with an annular groove indicated at 18 in which is seated an annular coil spring 20 which extends around and annularly completely fills the groove 18. In the form of spring shown in Fig. 1, the coils of the spring 20 are formed with a flat portion 21 as best illustrated in Fig. 2. The flat portion of the spring, just referred to, the coils being symmetrical, forms an inner gripping surface for receiving the outer face of the outer race 15. The inner diameter of the spring formed by such flat faces being slightly less than the inner diameter of the bore indicated at 17 so that the bearing may be forced into engagement with the gripping or bearing face of the coil spring.

As shown in Fig. 2a the flat faces of the coils are slightly curved on a very long radius as indicated at 21a but when the bearing is forced into place it assumes the form shown in Fig. 2. This feature allows the bearing to be inserted without tilting or cocking the spring. The slightly curved flat portion of the spring also results in tension on the bearing after it is in place in addition to that derived by the spring being expanded against the walls of the groove.

Figure 4:
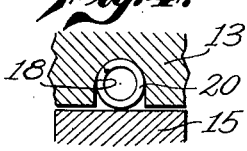
Fig. 4 is a view similar to Fig. 2 showing another form of my invention.

The mounting member, which in this illustration consists of the housing with the groove 18 therein and its associated coil spring, forms the mounting for the bearing in the form of my invention shown in Figs. 1 and 2. The sides of the groove 18 are spaced slightly apart from the coils of the spring so that the spring may be compressed as it receives the bearing member into tight engagement with the walls of the groove, as shown in Fig. 2 and Fig. 4, it being understood that in the form shown in Figs. 2 and 4 that the clearance in the groove at the sides of the spring exists only when the bearing is not in place in the mounting.

It will be noted that in the form illustrated in Fig. 1 the bearing "a" is not clamped against longitudinal movement and it will be readily seen that with a mounting constructed as above described the shaft is not only free to move longitudinally without destroying the efficiency of the bearing but that the shaft and its bearing at this end of the device may be angularly disposed with relation to the axis of the bore which receives the bearing in view of the fact that the coil spring may rock in the groove in the bearing.

The bearing "b" at the other end of the shaft 11 is likewise mounted on the shaft, but the mounting for the outer race of the bearing consists of a groove in a sleeve 22, indicated at 23. The sleeve 22 is provided at its inner end with an inwardly extending flange 24 which engages the outer race 15 of the bearing, and the outer race is clamped against the flange 24 by means of a ring 25 threaded into the sleeve 22, such sleeve being provided at its outer end with an outwardly extending flange 26 which engages the end of the housing. The bearing "b" is further maintained in its exact position on the shaft 11 by means of a collar 27 threaded to the shaft 11.

Figure 5:
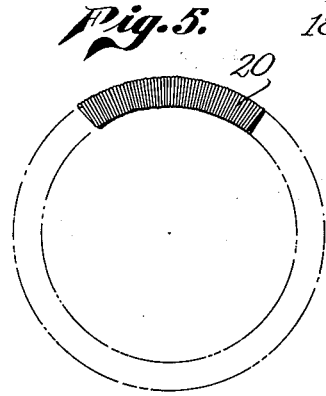
Fig. 5 is a side elevation of the coil spring forming the gripping member of the mounting.
Figure 6:
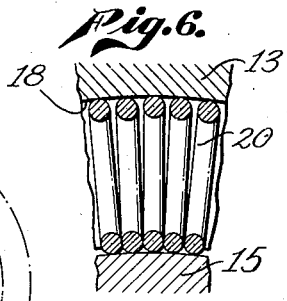
Fig. 6 is a sectional view of a portion of the spring as seated in the mounting.
Figure 7:
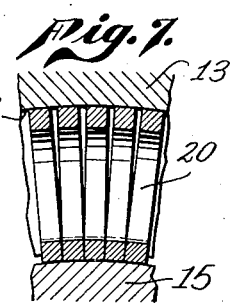
Fig. 7 is a view similar to Fig. 6, in which the wire forming the coils of the spring are shown as square in cross section instead of round as in Fig. 6.

It is to be understood that the coil spring forms a complete annular member as shown in Fig. 5 and that its inner face forms a substantially continuous surface for the reception of the outer race of the bearing member.

Figure 3:
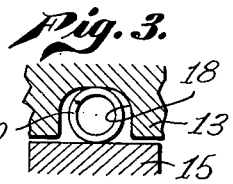
Fig. 3 is a view similar to Fig. 1, showing a second form of my invention.

While I have shown and described the coils of the spring as being flattened at one side it is to be understood that the coils may be round as shown in Figs. 3 and 4 in which cases the coils have what may be termed a single annular point or line of contact with the bearing. In the form shown in Fig. 3, the groove 18 is considerably wider than the diameter of the spring thereby permitting the spring to roll longitudinally of the axis of the bearing whereas, in Fig. 4, the width of the groove is only slightly greater than the diameter of the spring so that the coils of the spring may be compressed by the outer race of the bearing when the bearing is forced into place.

Figure 8:
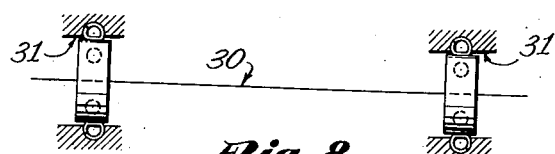
Fig. 8 is a diagrammatic view showing the position of the parts assumed where there is an angular displacement of the shaft.
Figure 9:
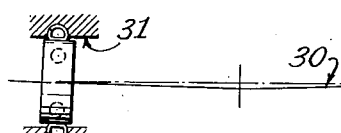
Fig. 9 is a view similar to Fig. 8 showing the relation of the parts when there is radial displacement of the shaft.

Fig. 8 diagrammatically illustrates a condition of angular displacement of the shaft indicated by the line 30, due to the fact that the bores 31 which receive the bearings are out of alignment; and Fig. 9 illustrates a condition where the bores 31 are in alignment but the bearings are angularly disposed with relation to each other due to the fact that the shaft is bent as shown by the line 30.

From the above description it will be apparent that the outer and inner race of the anti-friction bearing maintain their designed relationship by reason of the outer race being able to adjust itself in the bore of the mounting and change its position longitudinally in the bore to accommodate longitudinal movement of the shaft due to temperature or other changes.

The coil spring forms the only bearing engaging member so that it will readily appear that inaccuracies in the bore or oversize of the bore become immaterial and due to the fact that in all forms of spring used the portion of the spring contacting the walls of the groove affords a rocking contact which allows the bearing to assume its natural position.

It is further to be noted that while the bearing mounting, above described, is especially designed for use in situations where there is clearance between the outer race and the mounting, the spring also has advantages in close fitting structures where clearance may develop due to warpage of the casting forming the mounting or where temperature changes may result in clearance.

I claim as my invention:

1. In combination with an anti-friction bearing having an inner and outer race; a bearing mounting having a bearing receiving opening with an annular groove therein, and an annular coil spring in said groove having a bearing contacting surface inwardly of the mounting, said spring in cross section being formed with a substantially flat portion forming the bearing contacting portion.

2. In combination with an anti-friction bearing having an inner and an outer race; a bearing mounting having a bearing receiving opening with an annular groove therein; and a flexible annular coil spring in said groove contacting said mounting and said outer race, said spring being so formed that a cross section therethrough has different radii of curvature on the sides contacting said mounting and said outer race respectively.

3. In combination with an anti-friction bearing having an inner and an outer race: a bearing mounting having a bearing receiving opening with an annular groove therein; and an annular coil spring in said groove contacting said mounting and said outer race, said spring in cross section being formed with an inner segment of long radius providing a substantially flat surface contacting said outer race and an outer segment of short radius providing an arched surface for reception in said groove.

BENJAMIN C. ROBERTSON.